June 22, 1965   A. H. PETTERSON   3,190,409
JOINING MEANS
Original Filed Dec. 27, 1960
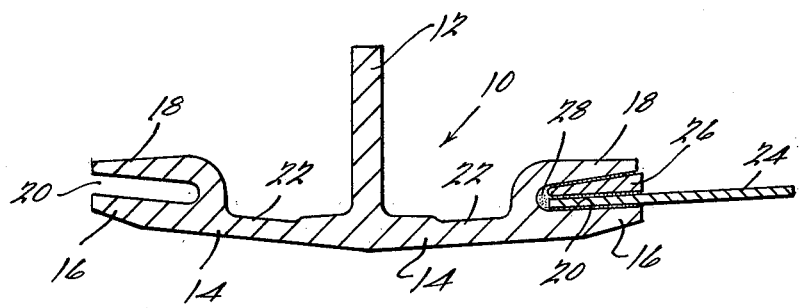
INVENTOR.
Adolf Helmer Petterson
BY
Harness, Dickey & Pierce,
ATTORNEYS.

United States Patent Office
3,190,409
Patented June 22, 1965

3,190,409
JOINING MEANS
Adolf Helmer Petterson, Goteborg, Sweden, assignor to Profile System International, Oslo, Norway
Continuation of application Ser. No. 78,681, Dec. 27, 1960. This application Jan. 8, 1962, Ser. No. 164,768
Claims priority, application Sweden, Jan. 9, 1960, 170/60
5 Claims. (Cl. 189—36)

The present invention relates to means for joining a first member to at least one other member in an elongated continuous joint, this application being a continuation of my co-pending application, Serial Number 78,681, now abandoned.

It is a primary object of the present invention to provide extremely simple, inexpensive, and novel means for joining together at least two members in an elongated continuous joint capable of withstanding high stresses as well as the leakage of fluid therethrough, which joint does not suffer any of the common disadvantages of conventional welded, riveted or bolted joints. A related object concerns the provision of a joint wherein there is a uniformly distributed pressure along the entire length of the joint, so that there are no point loads in any of the joint members, and so that modern high strength adhesives requiring uniform pressures for setting may be utilized in the joint.

A further object of this invention resides in the provision of a novel joint between a first grooved member, preferably an extrusion, and the flange of a second member, wherein the grooved member is so constructed that distorting forces applied to the second member will not tend to loosen or weaken the joint by deforming or deflecting the elements thereof, but instead will result in the harmless flexing of a remote portion of the first member.

Yet another object of this invention concerns the provision of a unique elongated continuous joint which may be conveniently and quickly effected between a first member having an elongated groove therein and a second member having an elongated flange receivable within the groove by an unskilled worker without the use of any special tools.

These and other objects of the present invention will become apparent from a consideration of the present specification taken in conjunction with the accompanying drawing, in which there is illustrated in cross-section for exemplary purposes the keel of a small boat incorporating the principles of the present invention to reinforce and secure together the bottom panels of the boat.

Broadly speaking, the underlying concept of the present invention resides in the provision of means for joining a first member to a second member in an elongated continuous joint, and comprises a first continuous elongated element on the first member defining one side of an elongated groove, a second continuous elongated element on the first member disposed substantially parallel to the first element and defining the other side of the groove, one of the elements being resiliently deflectable transversely with respect to the other of the elements, means defining a resiliently deflectable section in the first member extending longitudinally thereof remote from the elements, this section being more flexible than the elements in the same direction, elongated flange means on the second member receivable within the groove, and an elongated wedge-shaped member adapted to be forced into the groove when the flange means is positioned therein, whereby the stresses created in the deflected element defining the groove will tightly secure the flange means in the groove, and when forces sufficient to cause bending are applied to the joined members the extra-flexible section will be deflected and not the portions of the members defining the joint.

As will be more apparent hereinafter, these members to be joined may assume a variety of sizes and shapes for effecting joints of different applications, and in addition, may be so arranged that one of the members may be joined to a plurality of other members utilizing joints incorporating the principles of the present invention. Examples of different applications are set forth in my co-pending application, Serial Number 85,906. In any case, however, joints of this invention are elongated in nature, so that the depth or thickness of the joint is small relative to the length thereof, although the joint need not be straight in the longitudinal direction. While the accompanying view does not illustrate the length of the joint, since such a view would reveal nothing, it is to be understood the term "elongated" means of an indefinite length, greater than the width and thickness of the joint, in a longitudinal direction perpendicular to the plane of the drawing.

Referring to the drawing, there is shown an elongated keel member 10 which through application of the principles of the present invention is ideally suited for the manufacture of small boats. As can be seen, keel member 10, which may easily be extruded from any suitable material, such as an aluminum alloy or the like, is symmetrical about a longitudinally extending vertical central plane and is provided with a vertically extending rib 12 to which may be secured suitable frames, bulkheads, or other ordinary reinforcing and securing elements. Projecting outwardly in substantially opposite directions from the base of rib 12 are a pair of flanges 14, the outer ends of which are bifurcated to form lower and upper longitudinally extending elongated elements or legs 16 and 18, respectively, defining therebetween longitudinally extending elongated grooves 20. Legs 16 may constitute extensions of flanges 14, and legs 18 may be arranged to extend upwardly and outwardly therefrom, as shown, or may be formed in any other desired configuration so long as there is defined an elongated groove, preferably having substantially parallel sides. The configuration should also be such that the element defining one side of each groove is resilient or flexible with respect to the element defining the other side in a direction perpendicular to the longitudinal axis thereof. This is most easily achieved by forming the member of a material having resilient properties, such as aluminum, steel, plastic, or the like.

Each of flanges 14 are provided with a specially formed section 22 remote from the elongated groove, between the groove and the main support rib in the embodiment shown, which is of such a size and configuration that when forces are applied transversely to flanges 14 directly at the outer ends thereof or through the members to be positioned within grooves 20 it will be the sections 22 which bend or deflect and not the legs 16 and 18 defining the joining grooves. In the illustrated embodiment this is achieved by forming sections 22 relatively thin as compared with the remaining structure. A portion of one of the panel members to be joined to the keel, which panel members would be the bottom plates of a boat in this embodiment, is indicated at 24. For purposes of the present description, only one panel is shown, in the right hand groove, and the left hand groove is illustrated in its pre-assembly relaxed shape. Panel member 24, which may be formed of any suitable material, such as an aluminum alloy, or the like, is inserted loosely into groove 20, which is of a width greater than the thickness of the panel member it is adapted to receive, and is tightly secured therewithin by the forceable insertion into the groove of an elongated wedge-shaped member 26, in the manner illustrated. Since the sides of the groove are substantially parallel in the relaxed or unstressed state, as shown at the left of the figure, legs 16 and 18 will be deflected away from one another when the wedge-shaped member is forced into place so that the stresses in the deflected legs will further serve to clamp the panel member in place. The second member could of course be of any cross-sectional shape, so long as it is provided with a flange above one edge thereof for reception within an elongated joining groove. Wedge angles in the order of 5 degrees have been found to give very satisfactory results with aluminum alloys, however for any given application and material the wedge angle which will cause the greatest practical amount of force to be exerted against the panel member should be used.

If desired, the strength and seal of the joint may be increased by the coating of the sides of the grooves, panels, and wedge-shaped strips with a suitable adhesive, such as is shown at 28. Thus, after the wedge-shaped strips have been forced into place, the adhesive will fill in the irregularities of the cooperating surfaces of the joint to effect a good seal and a more permanent and stronger joint. Commercially available modern hardenable plastic type adhesives, such as the epoxy adhesives, have been found to be very effective. It should be noted, however, that the use of an adhesive is optional, since suitable joints having more than sufficient strength for many applications may be effected without the use thereof. In the event an adhesive is not used, the joint may be made completely fluid tight by the use of an ordinary sealing or calking compound. It has been found that in practice the simplest way to apply either adhesives or sealing compounds to a joint is to simply place a strip of the material in the bottom of the groove. When the wedge-shaped member is subsequently forced therein the material will be compressed to the point that it will flow between all the surfaces of the joint to effectively secure and/or seal it. In this regard, most of the modern adhesives with exceptionally high strength depend on the film thickness of the adhesive for strength, and therefore need an even pressure along the adhesive surfaces to insure a good joint, and the present joint is ideally suited to give this required even pressure.

Through the provision of sections 22, in the event that deflecting forces or distorting forces are applied to either the ends of flanges 14 or to the panel members in a direction substantially perpendicular to the planes thereof, the elements defining the joint will not be deflected or distorted to thereby weaken it, but instead realtively thin section 22 will simply be flexed or deflected. Flexing of section 22 will in no way effect the strength of the joint since the elements thereof will remain fixed with respect to each other. Since the tolerable amount of deflection in any application will depend on the application itself, the design criteria should be that the thin section should be more resilient or flexible than the flexible portions of the elongated member defining the panel receiving groove, in the same direction. In most applications preferably at least one relatively thin section is provided in each grooved member; for example, if the grooved member is to join a panel member to a support or to another panel member a single section would be positioned therebetween. In applications like the present keel, where two panels are secured to a support through rib 12, a thin section is provided between each groove and the rib.

Considering, for exemplary purposes, application of this invention to the manufacture of small boats, tremendous advantages may be realized using joints of the present invention. For example, an entire aluminum boat may be manufactured using nothing but several aluminum extrusions for the keel, chines, and gunwales, having suitably located grooves and thin sections therein, a plurality of pre-cut flat aluminum panels, and a plurality of wedge-shaped strips or members. The keel, chines, and gunwales would, of course, be pre-bent in the longitudinal direction to the final slightly curved shape desired, the front ends thereof being suitably beveled so as to accurately mate with each other and the rear ends shaped to fit the similarly constructed transom. To assemble a boat the flat pre-cut aluminum panels are loosely inserted into the appropriate grooves in the respective extruded members, the panels being bent by hand when necessary in order to insert them into the slightly curved portions of the grooves, such as near the bow of the boat. To insure that the craft will be water-tight, a strip of sealing material may be placed in the bottom of all the grooves before the panels are inserted therein. With the panel thus loosely inserted, an unskilled operator using nothing but a hammer may then force the wedge-shaped strips or members into the grooves into which the panel members have been placed. The job may be done quickly and efficiently and the resulting craft ready for use without further work being done to it.

Because of the ease of assembly, boats utilizing joints of the present invention are well suited to be sold in kit form for the relatively unskilled boat owner to assemble, no special tools being required. Alternately, manufacturers may ship boats in unassembled form to various small assembly plants throughout the country, avoiding the excessive freight costs which are involved when fully assembled boats are transported. As will be appreciated, since an entire boat in a collapsed state will consist of nothing more than a plurality of flat sheets, several slightly curved extrusions, and a number of wedge-shaped strips, the resulting package will be extremely small and the shipping costs proportionately low. In addition, any desired surface treatment may be performed prior to assembly, which is simpler than treating an assembled boat. Since only a hammer is needed to assemble a boat of the aforementioned construction, such may be done out in the field where electricity or other forms of power are not readily available. Assembly is further made easy by virtue of the fact that no critical alignment or fitting problems exist since the various grooves are much wider than the thickness of the panels they are to receive.

While only one embodiment of the present invention is illustrated, it is to be understood that the number of possible applications of the present joint is unlimited. Since the present joint is particularly suited to applications utilizing extruded shapes for the grooved member, and since any given open shape is just as easy and inexpensive to extrude as any other open shape, practically any arrangement of grooves, thin sections, support ribs, and so on may be readily formed for any particular application. In any case, however, joints of the present invention are elongated in nature, having a continuous uninterrupted joining action throughout the length thereof. As will be appreciated, any shape or size members can be joined according to the principles of the present invention so long as one of the members is provided with an elongated groove of sufficient width to receive the panel member or portions thereof to be secured. In the present specification the edge portion of a panel of sheet material to be joined is considered to be a "flange" even though it may not be distinguishable from the rest of the panel. A number of possible applications and modifications of the present invention are disclosed in my copending application, Serial Number 85,906. In any given application the particular wedge angle utilized will depend upon the specific materials being joined, and should be such that the maximum practical forces will be obtained, as will be readily determinable by one skilled in the art having knowledge of the principles of the present invention.

Thus, there are disclosed in the above description and in the drawing an exemplary embodiment of the present invention which fully and effectively accomplishes the objects thereof, however, it will be apparent that variations in the details of construction may be indulged in without departing from the sphere of the invention as herein described or the scope of the appended claims.

What is claimed is:

1. Means connecting a panel member to an elongated member, said elongated member comprising first elongated rib means formed integrally therewith and having a first surface one one side thereof, second elongated rib means formed integrally with said elongated member and disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, said rib means receiving a portion of the panel member therebetween and being spaced apart a distance greater than the thickness of said portion of the panel member, elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means, and means defining a resiliently deflectable section in said elongated member extending longitudinally thereof remote from said rib means, said section being more flexible than said rib means in the same direction.

2. Means as claimed in claim 1, wherein said elongated member is formed of an aluminum alloy.

3. Means as claimed in claim 1, wherein each of said rib means taper in cross-section toward the free edge thereof.

4. Means as claimed in claim 1, wherein the area of contact between said rib means and one side of said panel portion and said wedge means and the other side of said panel portion is substantially the same.

5. Means as claimed in claim 1, further comprising an adhesive on opposite faces of said panel portion.

References Cited by the Examiner

UNITED STATES PATENTS

| 569,235 | 10/96 | Rockwell | 20—92 |
| 647,872 | 4/00 | Pease | 20—92 |
| 1,761,451 | 6/30 | Ohnstrand | 114—88 X |
| 2,230,045 | 1/41 | Boden | 287—57.07 |
| 2,877,877 | 3/59 | Davis | 189—88 X |

RICHARD W. COOKE, Jr., *Primary Examiner.*

CORNELIUS D. ANGEL, JACOB L. NACKENOFF,
*Examiners.*